(12) United States Patent
Ramaswami et al.

(10) Patent No.: US 7,369,542 B1
(45) Date of Patent: May 6, 2008

(54) METHOD AND APPARATUS FOR ROUTING DATA

(75) Inventors: Vaidyanathan Ramaswami, Neshanic Station, NJ (US); Duncan K. Sparrell, Chester, NJ (US); Simon D. Byers, Summit, NJ (US); Kenneth W. Church, Seattle, WA (US)

(73) Assignee: AT&T Corp., New York, NY (US)

( * ) Notice: Subject to any disclaimer, the term of this patent is extended or adjusted under 35 U.S.C. 154(b) by 967 days.

(21) Appl. No.: 10/793,081

(22) Filed: Mar. 4, 2004

(51) Int. Cl.
*H04L 12/66* (2006.01)
(52) U.S. Cl. .................................. 370/352; 370/353
(58) Field of Classification Search ............... 370/352, 370/353
See application file for complete search history.

(56) References Cited

U.S. PATENT DOCUMENTS

| 4,048,447 A | 9/1977 | Maruta |
| 4,095,052 A | 6/1978 | Ching et al. |
| 4,703,477 A | 10/1987 | Adelmann et al. |
| 4,769,811 A | 9/1988 | Eckberg, Jr. et al. |
| 4,920,534 A | 4/1990 | Adelmann et al. |
| 2003/0133558 A1* | 7/2003 | Kung et al. ............ 379/215.01 |
| 2004/0042387 A1* | 3/2004 | Geile ........................ 370/206 |
| 2004/0146072 A1* | 7/2004 | Farmwald .................. 370/537 |
| 2004/0213216 A1* | 10/2004 | Barrass et al. .............. 370/360 |

* cited by examiner

*Primary Examiner*—Creighton Smith

(57) ABSTRACT

A method and apparatus for handling internet access telephone calls made via cable company telephone services. A head end data terminal receives cable signals and converts them into individual signals. An intelligent switch detects signals destined for an internet service provider and routes those signals on a separate path to the internet service provider. A central switch routes the other signals along a telephone network. A computer program can control the steps of receiving cable signals, converting them into voice band signals, routing the signals that are not for the intended recipient to a central switch, multiplexing the signals for the intended recipient together, and sending the multiplexed signals to the intended recipient.

29 Claims, 10 Drawing Sheets

METHOD AND APPARATUS FOR ROUTING DATA

BACKGROUND OF THE INVENTION

1. Field of the Invention

Embodiments of the present invention relate to telephony networks accessed via cable. Embodiments of the present invention specifically relate to methods and apparatuses that reduce loads on central switches caused by internet access through dial up cable telephone service.

2. Description of the Related Art

Cable companies have begun expanding their services beyond offering cable television programs. Many now offer customers services such as cable modem internet access and cable telephone service. While cable modem internet access is beneficial, some users are reluctant to pay the higher costs associated with that service. Thus, some users will opt for their cable company's telephone service but not cable modem internet access. When those users connect to the internet, they use their cable company's telephone services to directly dial their internet service provider.

Providing telephone service to large numbers of voice telephony users is usually not a significant problem. Most telephones are not in use at any one time, and most voice calls are relatively short, averaging around 4 to 5 minutes. However, that is not the case with a computer user who may stay in communication with his internet service provider for long periods of time, possibly many hours on end. Such long duration calls increase the costs associated with the telephone network since the telephone network must provide the required telephone lines and switching devices. Additionally, such long duration calls can congest the telephone network, which is designed using statistical data associated with the frequency and duration of voice calls. It has been demonstrated that such congestion can adversely impact even emergency services like 911 calling.

Therefore, it would be beneficial to reduce the costs and congestion effects associated with long duration internet access telephone calls made via cable company telephone services.

SUMMARY OF THE INVENTION

Embodiment of the present invention can reduce the costs and congestion effects associated with long duration internet access telephone calls made via cable company telephone services.

Some embodiments of the present invention include a head end data terminal for receiving cable-modem based signals and for converting them into a plurality of voice band signals, and a central switch for routing signals along a telephone network. Additionally, those embodiments include a line (or a plurality of lines) that runs to an identified recipient (e.g. an ISP) and an intelligent switch for parsing the plurality of voice band signals into a first group for the identified recipient and a second group that is not for the identified recipient. The intelligent switch directs the first group toward the line and the second group to the central switch.

Embodiments also include a method of communicating information. That method includes the steps of receiving cable-modem formatted signals, converting the received cable-modem formatted signals into voice band signals, determining if each voice band signal is for an intended recipient, routing the voice band signals that are not for the intended recipient to a central switch, multiplexing the voice band signals for the intended recipient together, and sending the multiplexed voice band signals to the intended recipient.

Embodiments of the present invention include a computer readable medium that contains instructions that control the communication of information. Those instructions include the steps of receiving cable-modem formatted signals, converting the received cable-modem formatted signals into voice band signals, determining if each voice band signal is for an intended recipient, routing the voice band signals that are not for the intended recipient to a central switch, multiplexing the voice band signals for the intended recipient together, and sending the multiplexed voice band signals to the intended recipient.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting its scope, for the invention may admit to other equally effective embodiments.

To facilitate understanding, identical reference numerals have been used, wherever possible, to designate identical elements that are common to the figures.

DETAILED DESCRIPTION OF THE PREFERRED EMBODIMENT

The principles of the present invention provide for methods and apparatus that reduce the costs and/or congestion effects associated with internet access telephone calls made via cable company telephone services.

Figure 1:
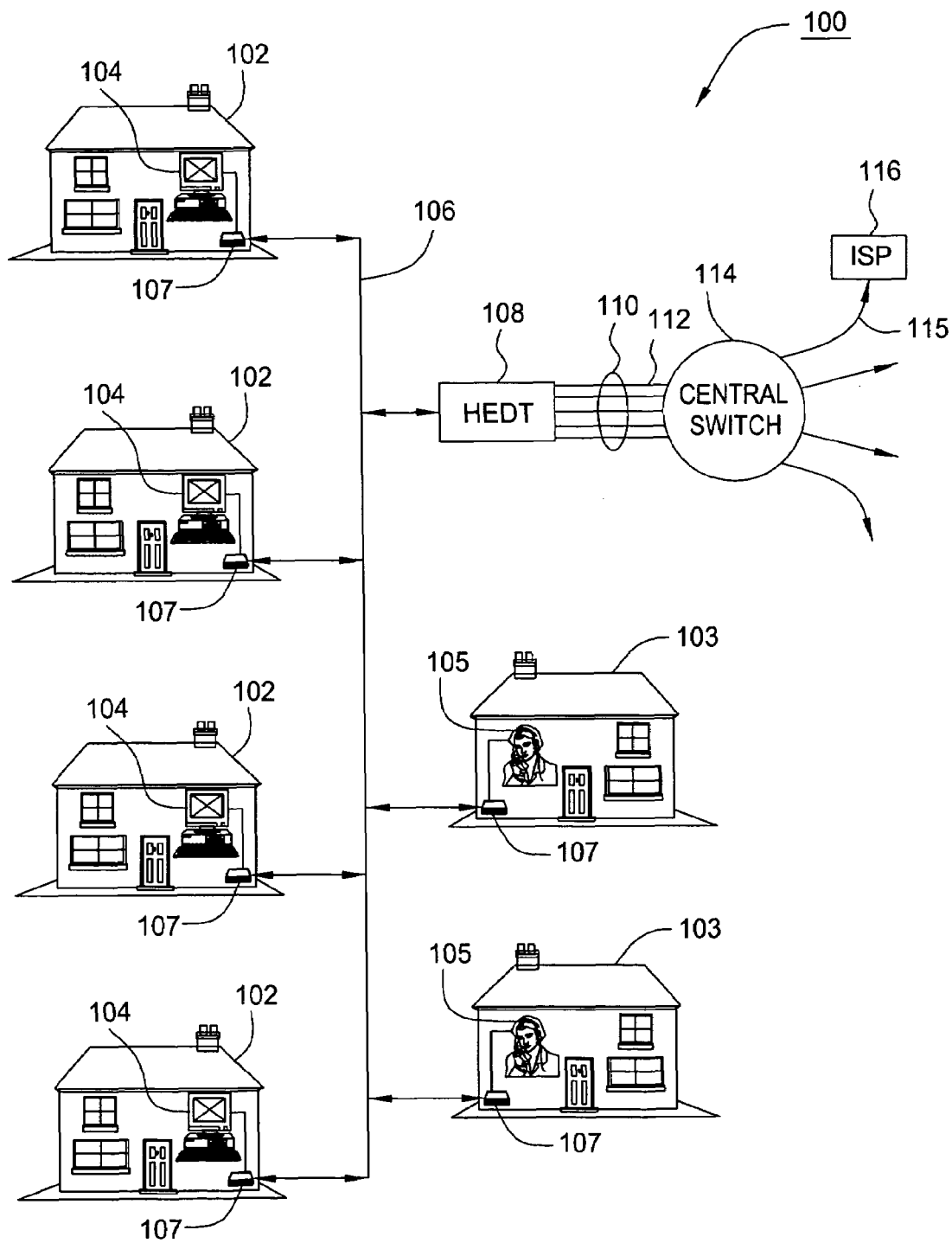
FIG. 1 illustrates a prior art communication network.

FIG. 1 illustrates an exemplary prior art communication network 100 that provides for both data communications and voice communications. A plurality of houses 102 have computers 104, while other houses 103 have people who communicate over their telephones 105. Of course, some houses will have both computers and telephones, and computers and telephones can be found at places other than houses. The computers 104 include modems that convert the computer's digital ones and zeros into corresponding analog tones in the voice band, which is the band of frequencies of telephone voice communications. The voice band signals from the computers 104 and from the telephones 105 both connect to converters 107. The converter 107 converts voice-band sounds into cable-modem formatted digital signals and applies them onto a shared cable 106. The cable 106 routes the cable-modem formatted digital signals to a head-end data terminal (HEDT) 108. Thus, some of the signals sent to the HEDT 108 are from computers while others are telephone communications.

The HEDT 108 converts the cable-modem formatted signals back into voice band analog signals. Those signals are applied to a telephone network 110 that is comprised of a plurality of wires 112 that run to a central switch 114. The central switch 114 then routes the various voice band signals to the rest of the telephony network as controlled by the dialing signals of each call. That telephony network specifically includes a wire 115 that connects signals from some of the various computers 104 to an intended recipient, which will be referred to hereinafter as an internet service provider 116. It should be understood that the communication network 100 also works in reverse. Voice band signals from the telephony network can be routed to the houses 102 and 103 via the various wires, the central switch 114, the HEDT 108, the cable 106, and the converters 107.

The communication network 100 has several problems. The owner of the wire 115 (e.g. the ISP, a long distance telephone provider, the cable company), or, based on some business relationship, some other entity, is charged access fees by the owner of central switch 114 for the time that signals pass through the central switch 114. If these were regular voice calls, this would not be a major problem since most telephones are not in use at any one time and since most telephone calls are relatively short, averaging 4 to 5 minutes. However, a computer user may use his computer 104 to communicate with the internet service provider 116 for long periods of time, possibly hours on end. Thus, the access charges to use the central switch 114 can become quite expensive for the owner of wire 115. The owner of wire 115 may pass these charges to the cable provider (owner of elements 106, 108). This access charge can be many millions of dollars per month for a given cable provider or ISP.

The owner of the central switch 114 also faces a problem in that the central switch 114 is loaded down for long periods of time by the computer users accessing the internet service provider 116. This causes a reduced communication capacity that may well require purchase and installation of another central switch 114. However, adding a central switch is costly, not only because of the cost of the switch, but the time and labor required to integrate a new central switch 114 with the telephone network 110.

Another problem with the communication network 100 is that it is rather inefficient. The computer 104 internally operates digitally, but communicates externally using a modem that converts digital one's and zero's into analog tones (and visa versa). The analog tones are fed to the converter 107 which converts the analog tones into cable-modem formatted signals suitable for the cable 106. In turn, the HEDT 108 converts the cable-modem formatted ones and zeros back into analog tones again for transmission over the telephone network 110. The central switch 114 has no way of determining whether the analog signals on the lines 112 are data or voice. The central switch 114 handles them both the same way, sending analog tones on line 115 to the internet service provider 116, which then converts the analog tones back into a digital format.

Figure 2:
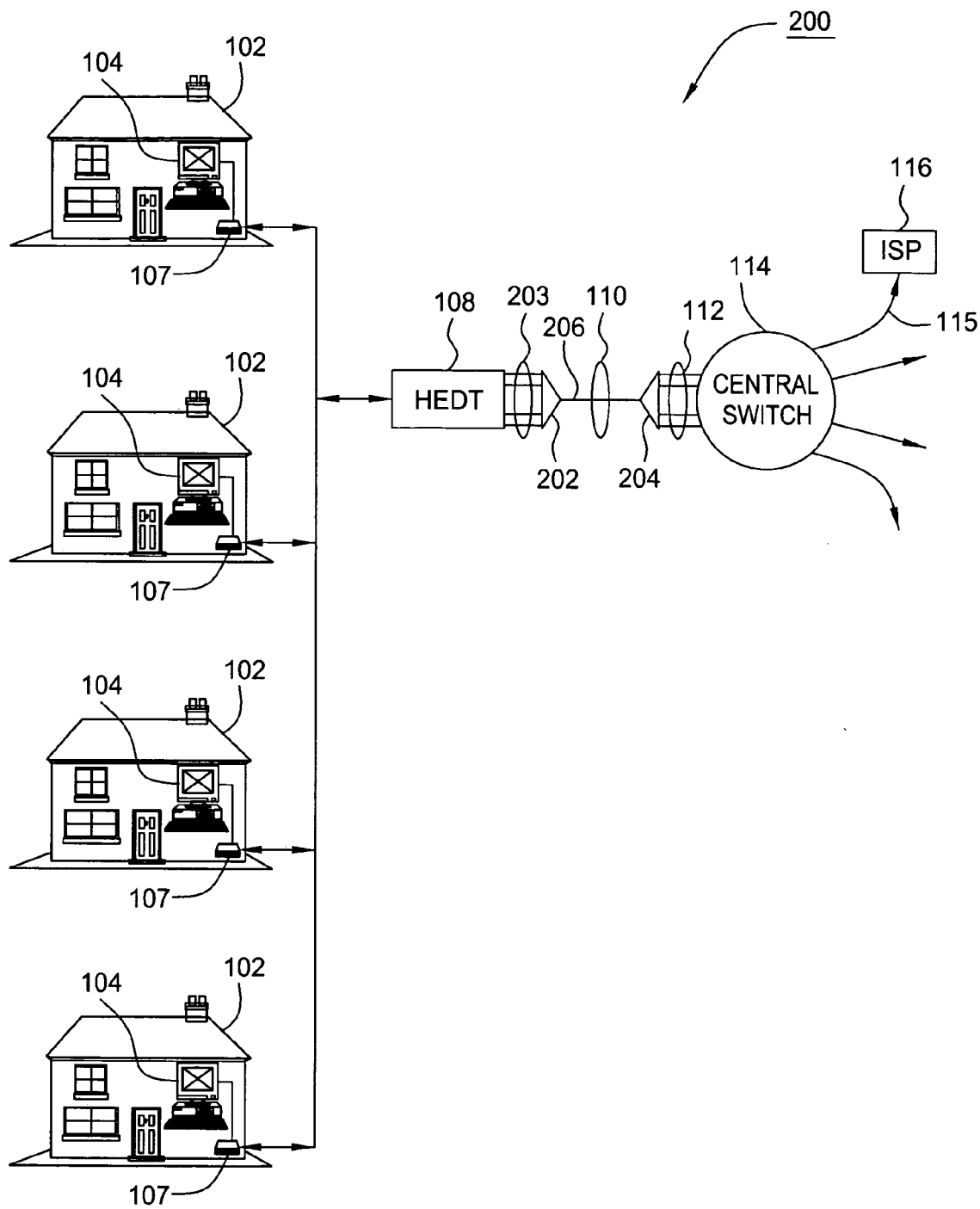
FIG. 2 illustrates an alternative prior art communication network.

FIG. 2 shows a prior art communication network 200 that in some ways represents an improvement to the communication network 100. The communication network 200 includes a set of compression boxes 202 and 204. Compression box 202 can multiplex multiple voice-band signals from the HEDT 108 onto a line 206. In turn, the multiplexed signals on line 206 are converted by compression box 204 back into individual analog signals that are then applied to the various wires 112. The signals on those wires are then routed by the central switch 114 to the remainder of the telephony network, including onto the line 115 to the internet service provider 116. By adding the compression boxes 202 and 204, the number of the wires 112 that must be strung is significantly reduced, which represents a cost saving. However, the communication network 200 does not reduce the required access to the central switch 114, and thus the access costs to the owner of the line 115 remains high; and the owner of the central switch 114 must take steps to ensure that it is not overloaded.

Figure 3:
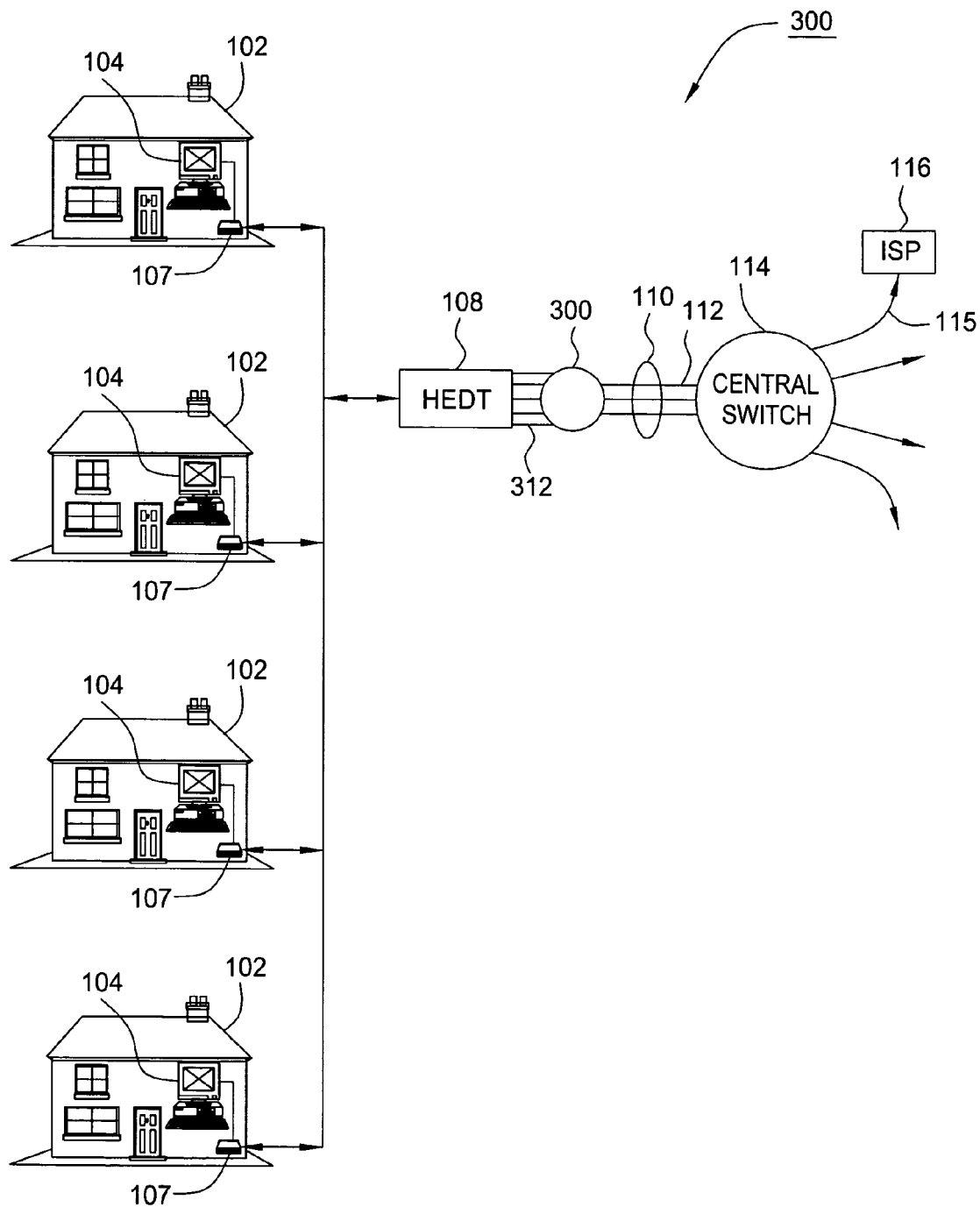
FIG. 3 illustrates yet another prior art communications network.

While the communication network 200 is useful in reducing the number of the wires 112, that reduction is at the cost of the compression boxes 202 and 204. FIG. 3 shows an alternative communication network 300, which is generally useful for voice and data communication. The difference between communication network 300 and the communication networks 100 and 200 is the incorporation of a concentration switch 300. The concentration switch 300 allows a reduced number of wires 112 to carry the signals coming from the HEDT 108 on wires 312. Concentration is a well-known technique that is based on the fact that most of the time, most of the possible analog signals, whether data or voice, are silent. These silences can be statistically used to switch signals onto the wires 112 which will carry to the central switch 114 and subsequently via wires 115 to the internet service provider 116. The communication network 300 has a particular benefit in that it reduces the load that is placed on the central switch 114.

The communication networks 100, 200, and 300 all share a particular limitation, they treat the computer data and the voice data the same. Only FIG. 3 shows any reduction in the load of the central switch 114. Long-duration IP access through the central switch 114 to and from the ISP provider 116 continues to impose a significant load on the central switch.

Figure 4:
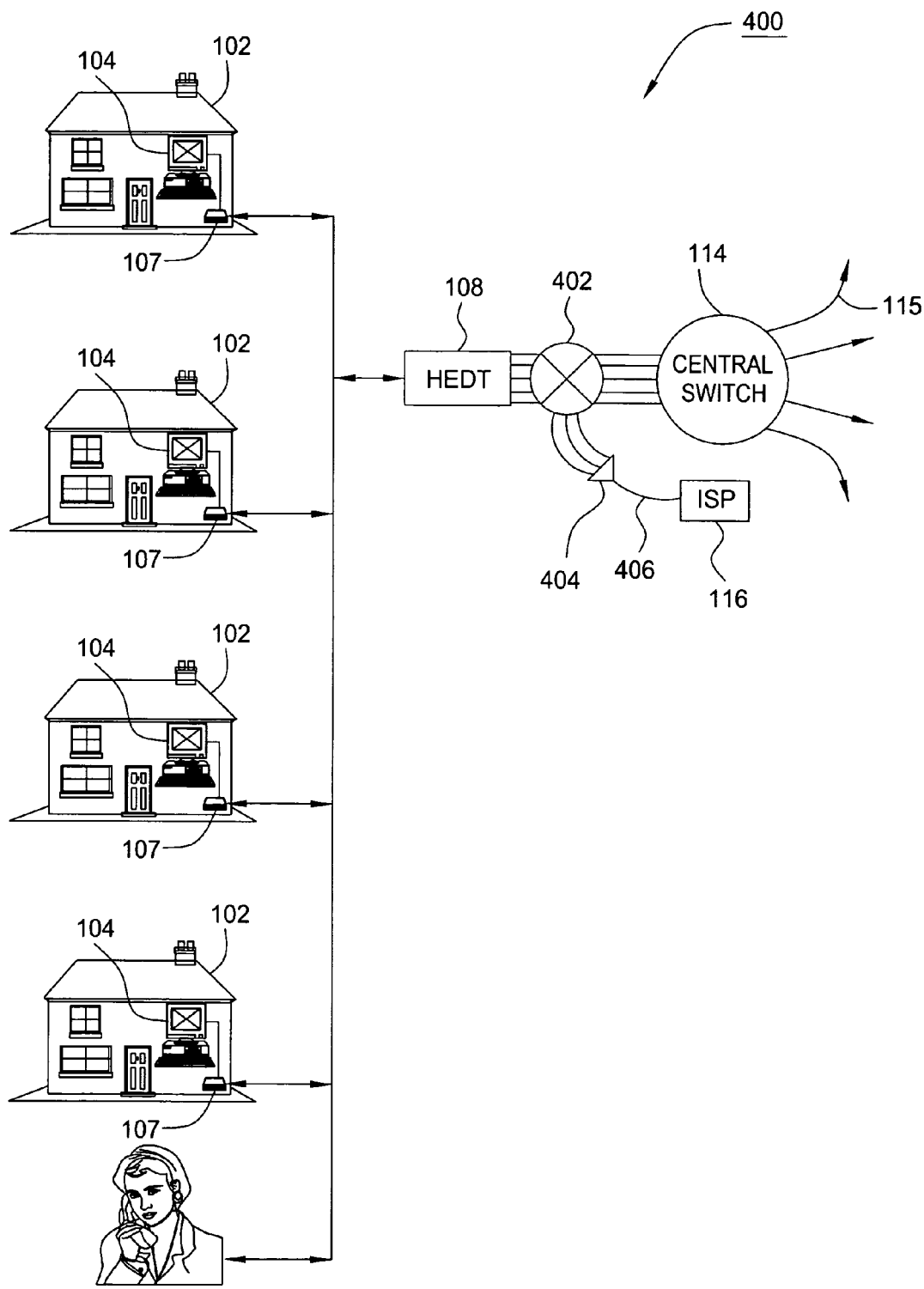
FIG. 4 illustrates a first embodiment communication network that is in accord with the principles of the present invention.

FIG. 4 illustrates a first embodiment communication network 400 that incorporates the principles of the present invention and that addresses limitations of the prior art. The system 400 includes an intelligent switch 402. The signals applied to the intelligent switch from the HEDT 108 will typically be voice band signals. However, in some applications this may not be the case. Thus, the signals applied to the intelligent switch can be generically referred to as intermediate signals. The intelligent switch 402 recognizes which of the intermediate signals from the HEDT 108 are going to the internet service provider 116, and thus to the same location. The intelligent switch 402 isolates all of the intermediate signals from the HEDT 108 going to the internet service provider 116 and sends them to a multiplexer 404 that multiplexes the signals together. The multiplexer 404 the sends the multiplexed signals on a dedicated line 406 to the internet service provider 116. This creates an advantage in that the data signals to (and from, since the multiplexer 404 and intelligent switch 402 are bi-directional) the internet service provider 116 are routed away from the central switch 114, which eliminates the access cost and the need to add more central switches to support all of the homes 102.

The communication network 400 depends on the ability of the intelligent switch 402 to determine which signals are going to the internet service provider 116. However, this can be done by having the intelligent switch 402 compare the dial-up phone numbers to a table that stores the phone number of the internet service provider 116. A match will signal that the dialing-in user is attempting to communicate with the internet service provider 116, and thus the call represents data. Since there are a large, but limited, number of major internet providers, the table need not be particularly large, for example, the largest 100 or so internet service providers.

Figure 5:
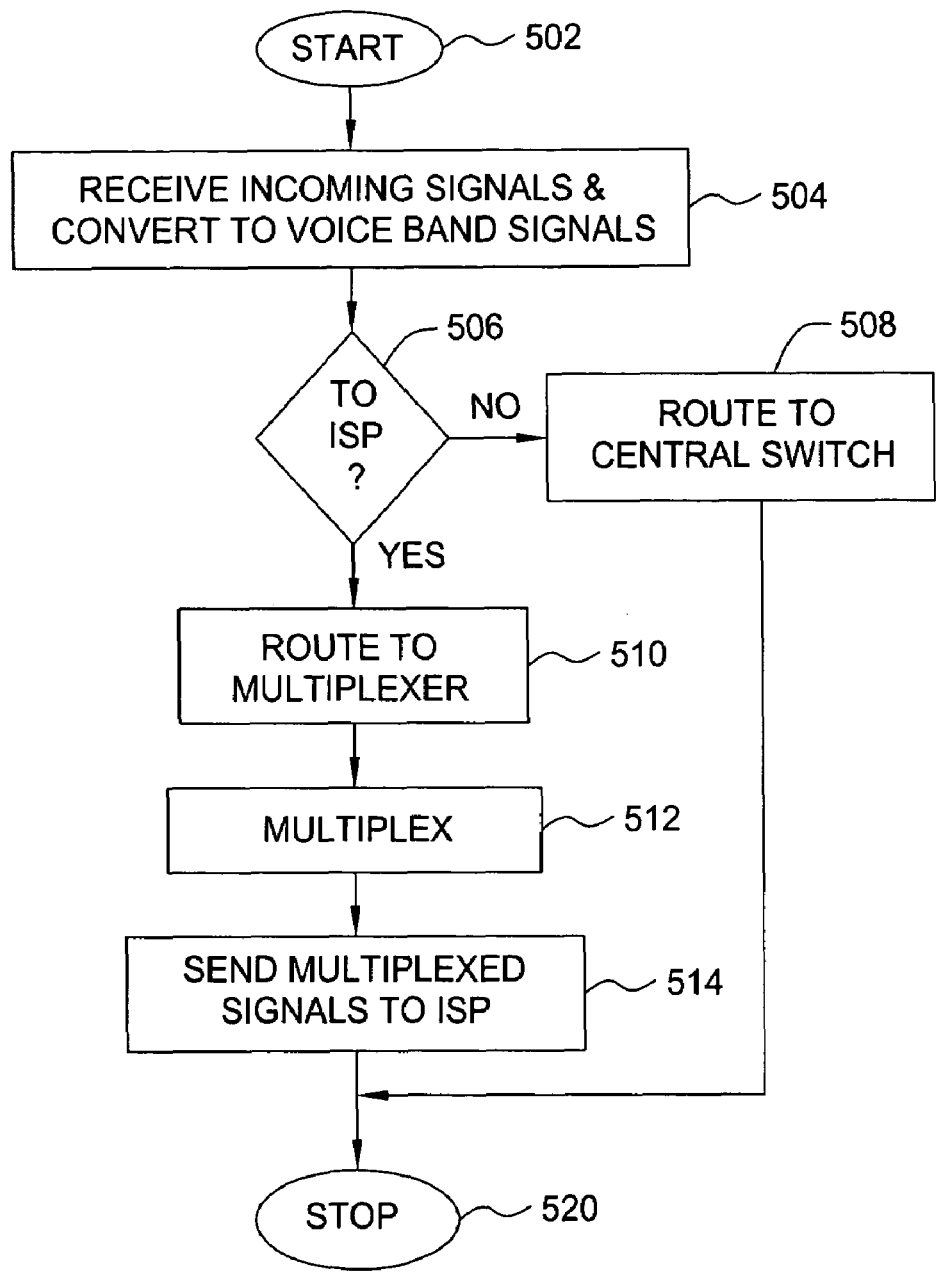
FIG. 5 illustrates a flow diagram of the network shown in FIG. 4.

FIG. 5 illustrates a method 500 of operating the communication network 400. That method starts at step 502 and proceeds at step 504 by receiving a signal from the HEDT 108. The intelligent switch 402 then determines at step 506 whether the incoming signal is going to an ISP provider. As noted, this can be done using a lookup table of internet service provider phone numbers. Alternatively, high-end intelligent switches 402 can monitor internet routing commands, typically located in communication packets, which can be used to identify which signals are going to an internet service provider. If the signal is not going to an internet service provider 116, at step 508 the signal is routed to the central switch 114 and the method 500 stops at step 520. However, if at step 506 the signal was determined to be going to an internet service provider 116, that signal is routed to the multiplexer 404, which at step 512 multiplexes that signal with other signals going to the internet service provider. Then, at step 514 the multiplexer sends the multiplexed signals to the internet service provider 116 by the dedicated line 406.

Figure 6:
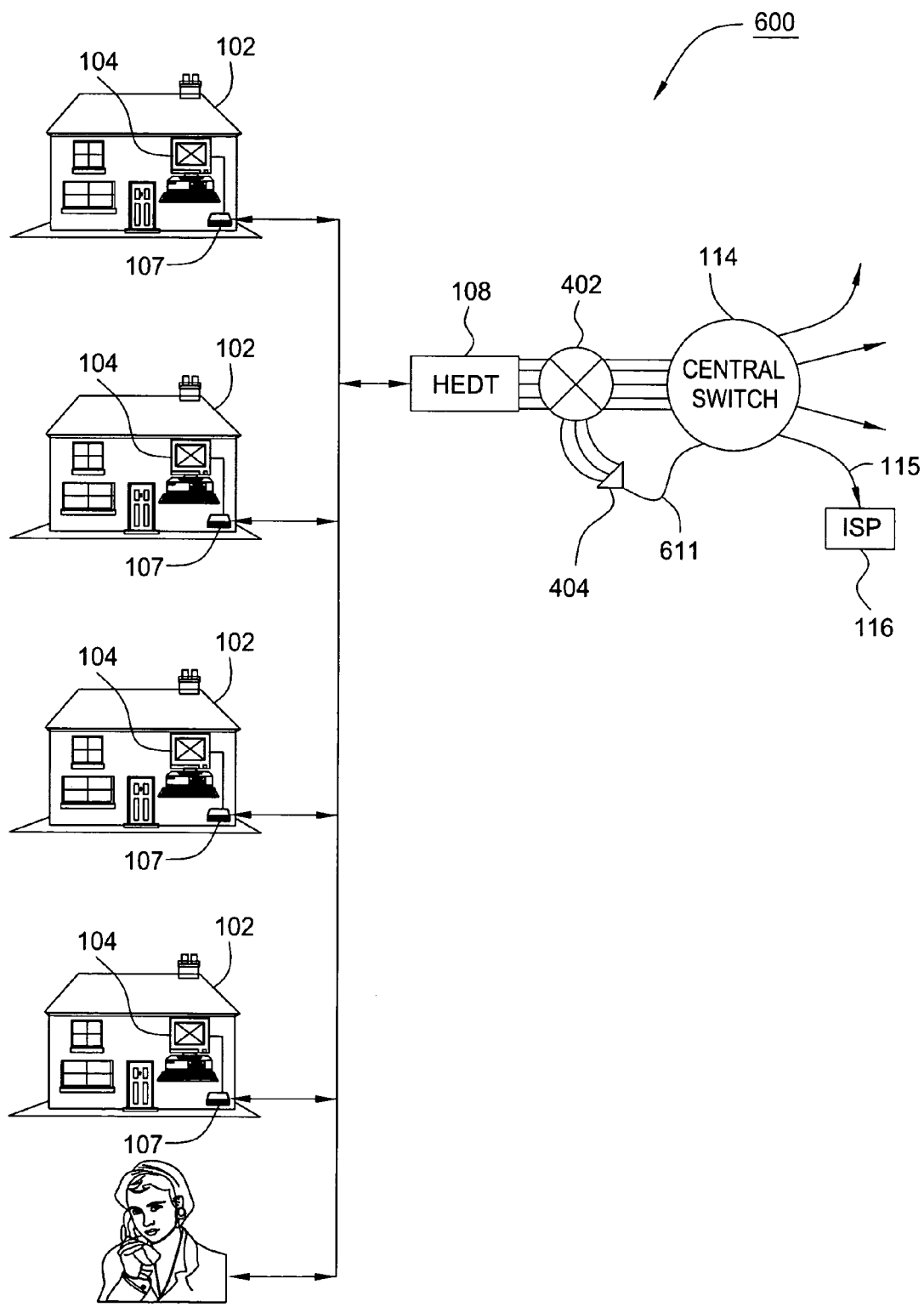
FIG. 6 illustrates an alternative embodiment communication network that is in accord with the principles of the present invention.

Advantages of the communication network 400 include reducing the access charges to the central switch 114, but at the cost of the dedicated wire 406. The significant disadvantage of having to pay for the dedicated line 406 can be reduced using the communication network 600 shown FIG. 6. As shown, the intelligent switch 402 and the multiplexer 404 work in the same manner as in the communication network 400. However, instead of sending the multiplexed signals onto a dedicated line 406, the communication network 600 routes the multiplexed signals onto a wire 611 that goes to the central switch 114. The communication network 600 may be easier to implement since the existing wiring to the central switch 114 is used and a dedicated line 406 is not required. Limitations include the fact that the central switch 114 is still partially loaded from the HEDT 108, but to a reduced degree.

Figure 7:
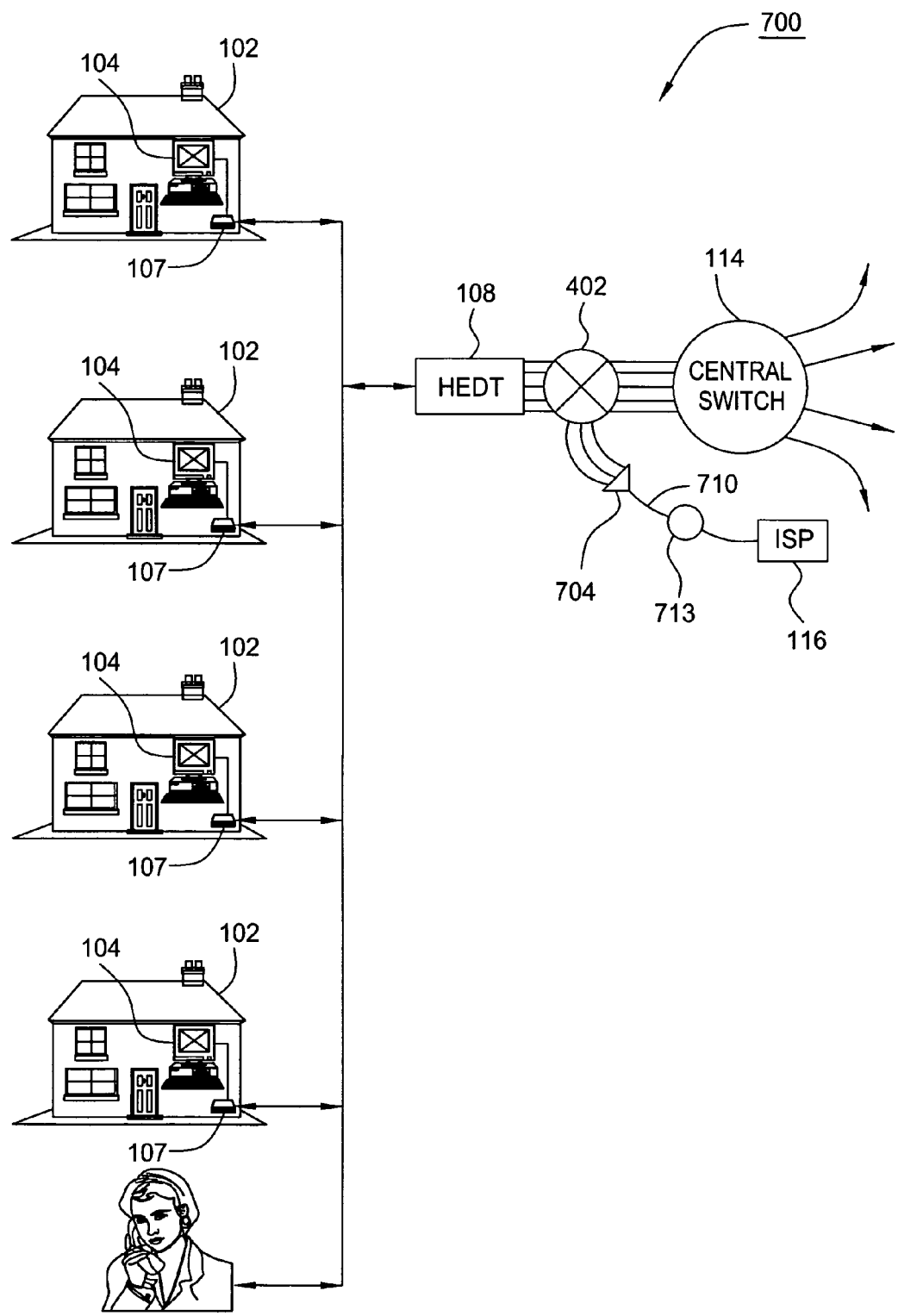
FIG. 7 illustrates yet another communication network that is in accord with the principles of the present invention.

FIG. 7 illustrates another communication network 700 that incorporates the principles of the present invention. In the communication network 700 the intelligent switch 402 operates as in communication networks 400 and 600 by detecting signals destined for the internet service provider. A multiplexer 704 then multiplexes the signals destined for the internet service provider together and routes the multiplexed signals via a line 710 to a reformater 713. The reformater 713 formats the multiplexed signals into an appropriate format (see below) and then sends the reformatted signals to the internet service provider 116. Reformatting may retain the analog signal format, in which case the network 700 acts as a dedicated telephony circuit. Alternatively, reformatting may include demodulation and conversion of the analog signals into a digital format such as a frame relay, an asynchronous transfer mode, or a packet Internet Protocol format. Thus, the reformater 713 can interface through the internet to communicate with the internet service provider 116. Again, the communication network 700 takes advantage of the existing networks to reduce the load on the central switch 114.

Figure 8:
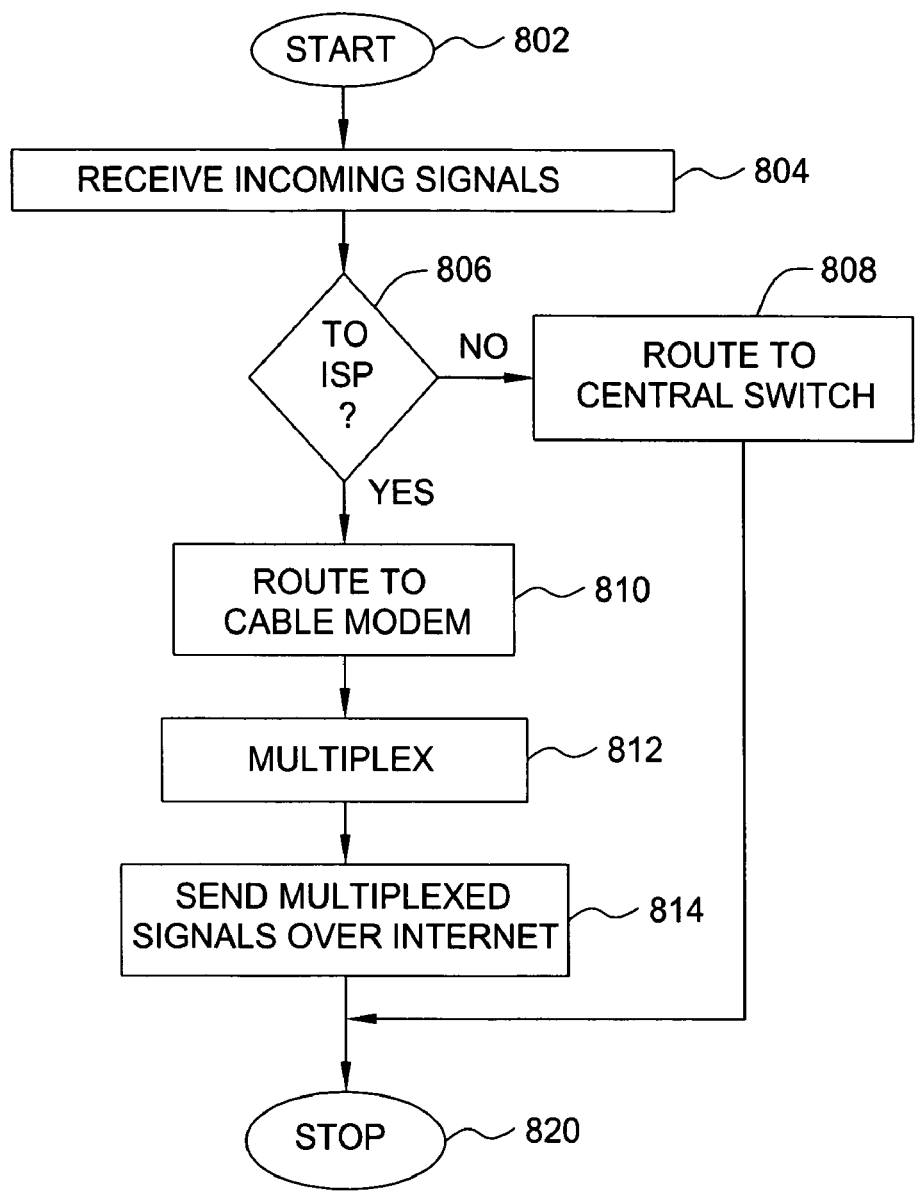
FIG. 8 illustrates a flow diagram of the operation of the system shown in FIG. 7.

FIG. 8 illustrates a method 800 of operating the communication network 700. That method starts at step 802 and proceeds at step 804 by receiving a signal from the HEDT 108. The intelligent switch 402 then determines at step 806 whether the incoming signal is going to an internet service provider 116. As noted, this can be done using a lookup table of internet service provider phone numbers. If the signal is not going to the internet service provider 116, at step 808 the signal is routed to the central switch 114 and the method stops at step 820. However, if at step 806 the signal was determined to be going to an internet service provider 116, that signal is routed to the multiplexer 704, which at step 812 multiplexes that signal with other signals going to the internet service provider 116. The cable modem 704 output is applied at step 814 to the line 710, which routes the multiplexed signals to the reformater 713. The reformater 713 formats the signals into suitable form for transmission to the internet service provider 116 (say, in onto packet Internet Protocol format), and then sends the formatted signals to the internet service provider 116. The method 800 then stops at step 820.

Figure 9:
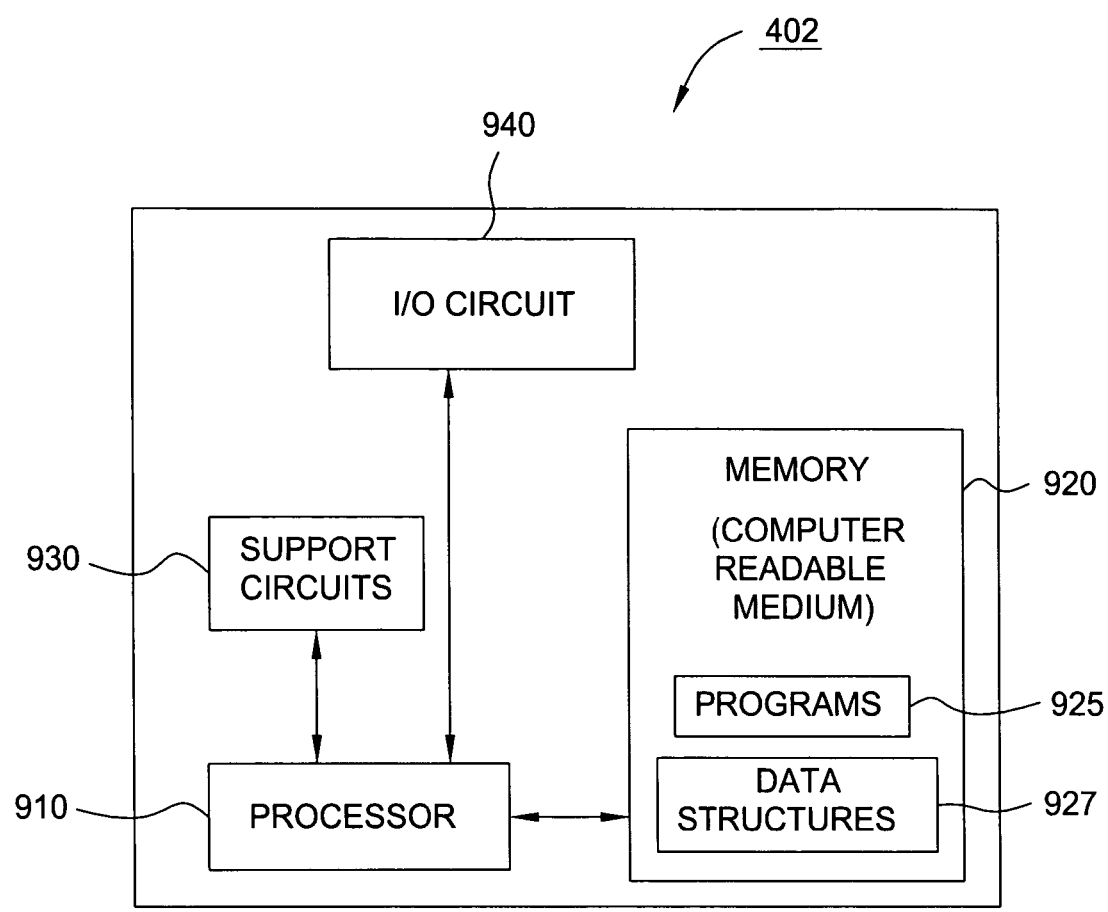
FIG. 9 illustrates an intelligent switch.

FIG. 9 depicts a high level block diagram of an embodiment of an intelligent switch 402. The intelligent switch 402 comprises a processor 910 as well as a memory 920 for storing control programs 925 and data structures 927, such as a table that contains the dialing number for the internet service provider 116. The processor 910 cooperates with conventional support circuitry 930 such as power supplies, clock circuits, cache memory and the like as well as circuits that assist in executing the software routines stored in the memory 920. As such, it is contemplated that some of the process steps discussed herein as software processes may be implemented within hardware, for example, as circuitry that cooperates with the processor 910 to perform various steps. The intelligent switch 402 also contains input-output circuitry 940 that receives input from the HEDT 108 and that outputs signals that are to be multiplexed.

Although the intelligent switch 402 is depicted as a processor controlled device that is programmed to perform various functions in accordance with the present invention, the intelligent switch 402 can be implemented in hardware, for example, as an application specified integrated circuit (ASIC). As such, the method steps described herein are intended to be broadly interpreted as being equivalently performed by software, hardware, or a combination thereof. Furthermore, the memory 920 is a computer readable memory 926 that stores information that can be run and/or accessed by the processor 910. However, other computer readable media include, but are not limited to a disk drive, an optical disk, a floppy disk and so on.

Figure 10:
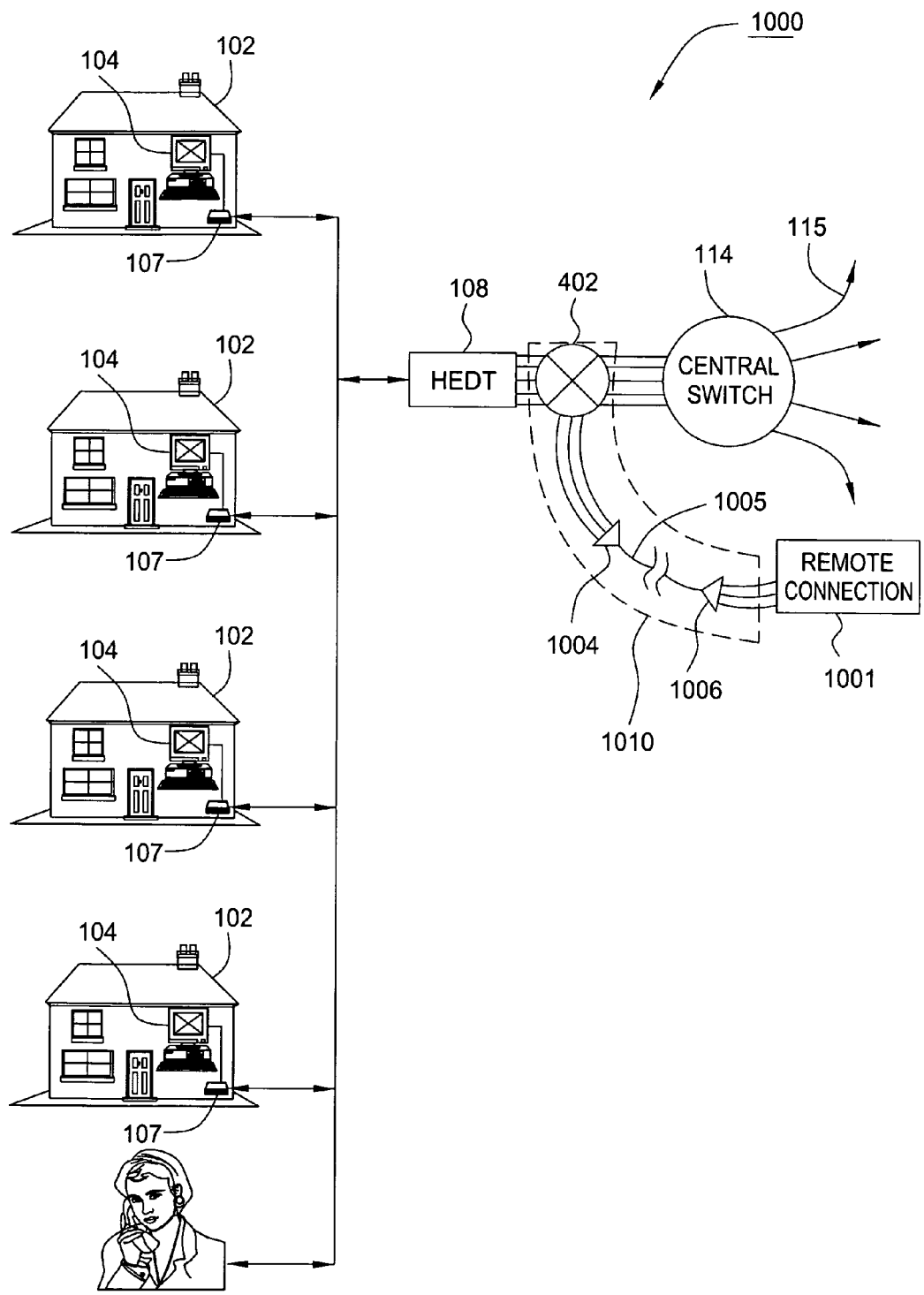
FIG. 10 illustrates still another embodiment communication network that is in accord with the principles of the present invention.

FIG. 10 illustrates still another embodiment communication network 1000 that incorporates the principles of the present invention. The network 1000 includes an intelligent switch 402 that recognizes which of the signals from the HEDT 108 are going to a remote connection 1001, which could be, but need not be, an internet service provider. As in previous embodiments the intelligent switch 402 isolates the signals going to the remote connection 1001. However, in the network 1000 the intelligent switch 402 sends the isolated signals to a driver 1004 that multiplexes the signals together, and drives them on a dedicated line 1005 to a receiver 1006. The receiver 1006 demultiplexes the signals from the intelligent switch and applies them to the remote connection 1001. The driver 1004, the dedicated line 1005, and the receiver 1006 do not have to be operated in the voice band, or even electronically. For example, the dedicated line 1005 could be an optical fiber or a microwave link.

FIG. 10 shows a dash-lined box 1010 around the intelligent switch 402, the driver 1004, the dedicated line 1005, and the receiver 1006. Ownership of one or more of the devices within the dash-lined box 1010 can be beneficial to number of different entities. A cable provider can benefit from owning one or more of those devices to provide their customers with better access to the remote connection 1001 at lower cost and with higher quality. The owner of the central switch 114, the local telephone company, can use those devices to save their own infrastructure and/or to avoid blocking, which is a quality issue for the local. Other telephone companies can use the devices within the dash-lined box 1010 to bypass the local telephone company, which reduces access fees. For example, the remote connection 1001 could be a remote telephone company. When the remote telephone company provides the devices within the dashed box, the remote telephone company can bypass the local telephone company and provide direct access. The remote connection 1001, say an internet service provider, can use the devices within the dash-lined box 1010 to provide better service to its customers.

While the foregoing is directed to embodiments of the present invention, other and further embodiments of the invention may be devised without departing from the basic scope thereof, and the scope thereof is determined by the claims that follow.

The invention claimed is:

1. A communication network comprising:
a head end data terminal for receiving cable-modem based signals and for converting them into a plurality of intermediate signals;
a central switch for routing signals along a telephone network; and
an intelligent switch for parsing said plurality of intermediate signals into a first group comprised of data signals for an identified recipient and into a second group comprised of intermediate signals that are not for said identified recipient;
wherein said intelligent switch directs said first group toward a line that runs to said identified recipient and said second group to said central switch.

2. The network of claim 1, further comprising a multiplexer for receiving said first group from said intelligent switch, for multiplexing the signals of said first group together, and for applying said multiplexed first group onto said line.

3. The network of claim 2, wherein said line directs said multiplexed first group through said central switch.

4. The network of claim 2, wherein said line bypasses said central switch.

5. The network of claim 1, further comprising a cable for applying said cable-modem based signals to said head end data terminal.

6. The network of claim 5, further comprising a plurality of converters for converting voice band signals to cable-modem based signals, and for applying said cable-modem based signals to said cable.

7. The network of claim 5, wherein said intended recipient is an internet service provider.

8. The network of claim 1, further comprising a reformatter for receiving said first group from said intelligent switch, for formatting the signals of said first group together to form formatted signals, and for applying said formatted signals onto a network.

9. A method of communicating comprising the steps of:
receiving cable-modem formatted signals;
converting the received cable-modem formatted signals into intermediate signals;
determining for each intermediate signal if it is for an intended recipient;
routing the intermediate signals not for the intended recipient to a central switch;
multiplexing the intermediate signals for the intended recipient together; and
routing the multiplexed intermediate signals to the intended recipient.

10. The method of claim 9, where the step of determining if each intermediate signal is for an intended recipient is performed by comparing dialing numbers to the contents of a look-up table that includes the dialing number of the intended recipient.

11. The method of claim 9, where the step of sending the multiplexed intermediate signals to the intended recipient is performed along a dedicated line.

12. The method of claim 9, where the step of sending the multiplexed intermediate signals to the intended recipient is performed along a line that runs through the central switch.

13. The method of claim 9, where the step of multiplexing the intermediate signals for the intended recipient together results in network formatted signals suitable for transmission over an external network.

14. The method of claim 9, where the step of receiving cable-modem formatted signals includes:
producing a plurality of voice band signals;
converting the plurality of voice band signals to formatted signals;
sending the formatted signals on a network; and
receiving the formatted signals from the network.

15. A computer readable medium for storing a computer program that performs the steps of:
receiving cable-modem formatted signals;
converting the received cable-modem formatted signals into intermediate signals;
determining if each intermediate signal is for an intended recipient;
routing the intermediate signals not for the intended recipient to a central switch;
multiplexing the intermediate signals for the intended recipient together; and
sending the multiplexed intermediate signals to the intended recipient.

16. The computer readable medium of claim 15, where the step of determining if each intermediate signal is for an intended recipient is performed by comparing dialing numbers to the contents of a look-up table that includes the dialing number of the intended recipient.

17. The computer readable medium of claim 15, where the step of sending the multiplexed intermediate signals to the intended recipient is performed along a dedicated line.

18. The computer readable medium of claim 15, where the step of sending the multiplexed intermediate signals to the intended recipient is performed along a line that runs through the central switch.

19. The computer readable medium of claim 15, where the step of multiplexing the intermediate signals for the intended recipient together results in network formatted signals that are suitable for transmission over an external network.

20. The computer readable medium of claim 15, where the step of receiving cable-modem formatted signals includes:
producing a plurality of voice band signals;

converting the plurality of voice band signals to cable formatted signals;

sending the cable-modem formatted signals on a cable; and receiving the cable-modem formatted signals.

21. A communication network comprising:

a head end data terminal for receiving cable-modem based signals and for converting them into a plurality of intermediate first and second signals;

a central switch for routing said intermediate second signals along a telephone network;

a driver for driving applied signals onto a line;

an intelligent switch for parsing said plurality of intermediate first and second, for sending intermediate second signals to said central switch, and for applying said intermediate first signals to said driver; and a receiver for receiving said intermediate first signals and for directing said intermediate first signals to said identified recipient.

22. The network of claim 21, wherein the driver multiplexes said intermediate first signals before driving them onto said line.

23. The network of claim 21, wherein said intended recipient is an internet service provider.

24. The network of claim 21, wherein said intended recipient is a telephone company.

25. An apparatus, comprising:

means for receiving cable-modem formatted signals;

means for converting the received cable-modem formatted signals into intermediate signals;

means for determining for each intermediate signal if it is for an intended recipient;

means for routing the intermediate signals not for the intended recipient to a central switch; and means for routing the intermediate signals to the intended recipient.

26. The apparatus of claim 25, wherein the means for determining for each intermediate signal if it is for an intended recipient includes a look-up table of intended recipients.

27. The apparatus of claim 25, wherein the means for converting the received cable-modem formatted signals into intermediate signals includes a means for converting cable modem signals to voice band signals.

28. The apparatus of claim 25, further including a multiplexer for multiplexing intermediate signals for the intended recipient together.

29. The apparatus of claim 25, further including the central switch.

* * * * *